(12) United States Patent
Kotecha

(10) Patent No.: US 8,971,886 B2
(45) Date of Patent: Mar. 3, 2015

(54) SERVICE CREATION USING MOBILE DEVICE

(71) Applicant: Verizon Patent and Licensing, Inc., Basking Ridge, NJ (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 13/770,122

(22) Filed: Feb. 19, 2013

(65) Prior Publication Data

US 2014/0235239 A1 Aug. 21, 2014

(51) Int. Cl.
*H04W 4/00* (2009.01)
*H04W 60/00* (2009.01)
*H04W 8/24* (2009.01)

(52) U.S. Cl.
CPC .............. *H04W 60/00* (2013.01); *H04W 8/245* (2013.01)
USPC ................... 455/435.1; 455/552.1; 455/553.1

(58) Field of Classification Search
None
See application file for complete search history.

(56) References Cited

U.S. PATENT DOCUMENTS

| | | | |
|---|---|---|---|
| 2002/0081992 A1* | 6/2002 | Keller et al. | 455/410 |
| 2005/0197098 A1* | 9/2005 | Trossen | 455/406 |
| 2010/0093342 A1* | 4/2010 | Ramachandra Rao et al. | 455/432.1 |

* cited by examiner

*Primary Examiner* — Suhail Khan

(57) ABSTRACT

A method may be performed by a mobile device. The method may include receiving subscriber input for a temporary service account for a user associated with a portable device and creating the temporary service account. The method may also include receiving, from the portable device via a local wireless network, a registration request to use the temporary service account and assigning, to the portable device, a temporary mobile number selected from an available pool of mobile numbers. The method may also include sending, via the local wireless network, a registration confirmation to the portable device and providing, to the portable device, mobile services using both a broadband cellular network and the local wireless network.

20 Claims, 10 Drawing Sheets

FIG. 4

| DEVICE ID | USER ID | PASSWORD | IP ADDRESS | TEMPORARY MOBILE NUMBER | SESSION EXPIRATION |
|---|---|---|---|---|---|
| 06-00-00-00-00-00 | Jonny_D | ****** | 172.16.XXX.1 | 555-555-5555 | 60 mins. |
| 04-00-00-00-00-00 | RaulJ | ****** | 172.14.XXX.1 | 555-555-5544 | 14:00 GMT |
| ------ | Jills_Tablet | ****** | ------ | ------ | Disabled |

SERVICE CREATION USING MOBILE DEVICE

BACKGROUND

Most mobile devices are primarily used as communication and entertainment devices. With advancements in computer and wireless technologies, mobile devices are becoming very powerful, computing-intensive devices with networking capabilities that allow for additional uses.

BRIEF DESCRIPTION OF THE DRAWINGS

FIG. 4 is a diagram of an exemplary service list table according to an implementation described herein;

DETAILED DESCRIPTION OF PREFERRED EMBODIMENTS

The following detailed description refers to the accompanying drawings. The same reference numbers in different drawings may identify the same or similar elements.

Systems and methods described herein may use a connected mobile device to provide services to certain portable devices that do not have access to broadband cellular service. The mobile device may manage multiple high-speed wireless connections to support a subscriber's own services along with services for one or more portable device users. The portable device may establish a local wireless connection with the mobile device, which may then provide access to the broadband cellular service.

In one implementation, a mobile device may receive subscriber input for a temporary service account for a user associated with a portable device. The mobile device may create the temporary service account based on the subscriber input. The mobile device may receive, from the portable device and via a local wireless network, a registration request to use the temporary service account. The mobile device may assign, to the portable device, a temporary mobile number selected from an available pool of mobile numbers, and may send a registration confirmation to the portable device via the local wireless network. The mobile device may then provide mobile services to the portable device using both a broadband cellular network and the local wireless network.

As used herein, the term "mobile device" may generally refer to user equipment that provides access to a subscription-based broadband cellular service. As used herein, the term "portable device" may generally refer to a consumer electronics device that provides local wireless connectivity without access to broadband cellular service. As used herein, the term "subscriber" may refer to a mobile device customer and/or one who operates a mobile device. As used herein, the term "user" may refer particularly to a user of a portable device or, in some contexts, an operator of any type of device.

Figure 1:
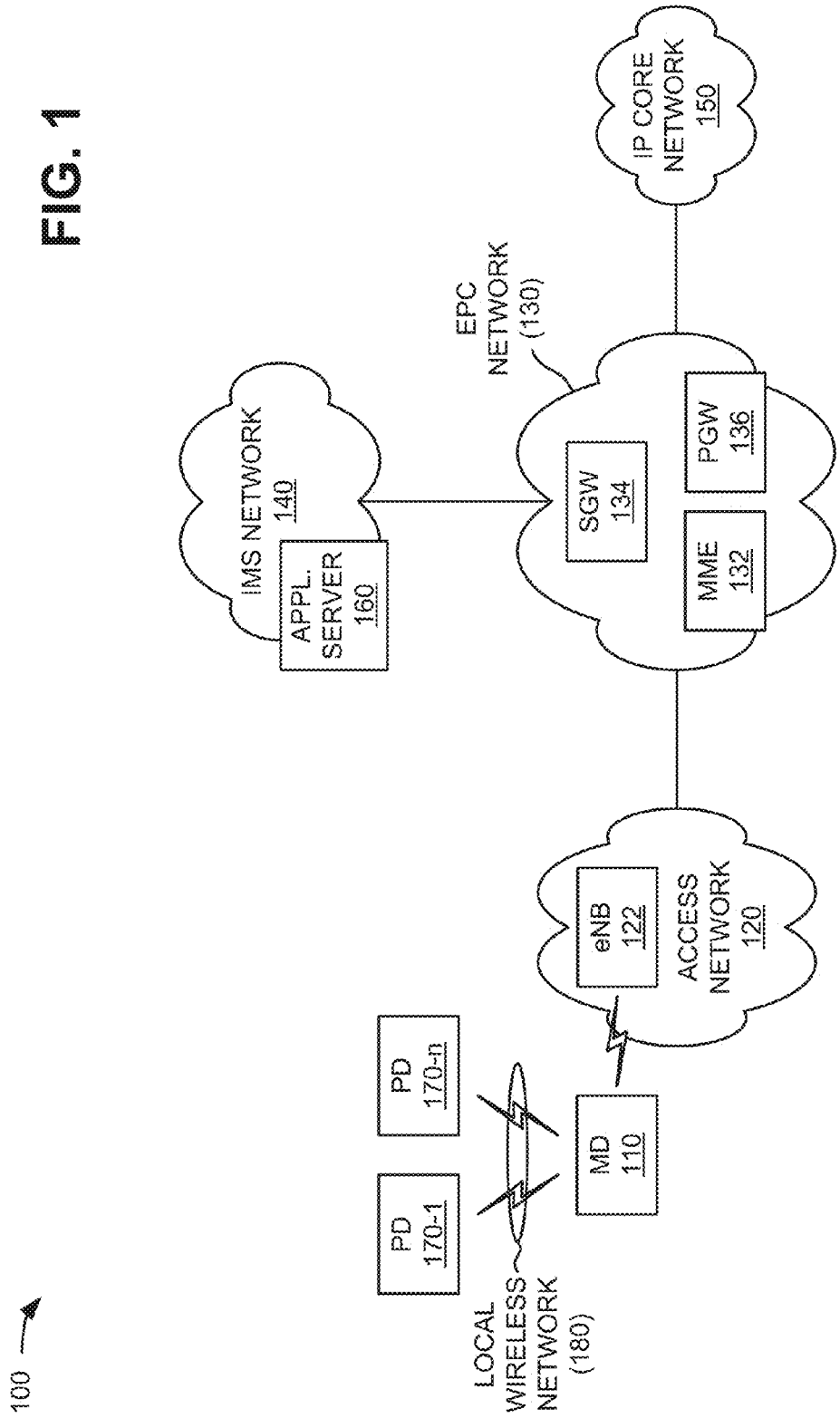
FIG. 1 depicts an exemplary network in which systems and/or methods described herein may be implemented.

FIG. 1 is an exemplary network 100 in which systems and/or methods described herein may be implemented. As illustrated, network 100 may include a mobile device (MD) 110, an access network 120, an evolved packet core (EPC) network 130, an IP multimedia subsystem (IMS) network 140, an IP core network 150, an application server 160, portable devices (PD) 170-1 through 170-n (referred to herein collectively as "portable devices 170" and generically as "portable device 170"), and a local wireless network 180. Access network 120 may include an eNodeB (eNB) 122. EPC network 130 may include a mobility management entity (MME) 132, a serving gateway (SGW) 134, and a packet data network (PDN) gateway (PGW) 136. Devices and/or networks of network 100 may interconnect via wired and/or wireless links.

Mobile device 110 may include a radiotelephone, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, or other types of computation or communication devices. In an exemplary implementation, mobile device 110 may include a device that is capable of communicating over access network 120, EPC network 130, IMS network 140, and/or IP core network 160 (referred to herein generally as "broadband cellular network" or a network providing "broadband cellular service"). Mobile device 110 may also be capable of communicating via a local wireless network (e.g., local wireless network 180). In implementations described herein mobile device 110 may have the capability to conduct multiple, simultaneous sessions using a broadband cellular service, such as conducting multiple VoIP calls, video-telephony calls, or internet sessions. In implementations described herein, mobile device 110 may be provided with a service creator application that accepts service requests over a local wireless network (e.g., from portable devices 170) and provides authorized portable devices 170 with access to broadband cellular services.

Access network 120 may include a wireless communications network that connects subscribers (e.g., mobile device 110) to a service provider (e.g., EPC network 130). In one example, access network 120 may include a long-term evolution (LTE) network. In other implementations, access network 120 may employ other wireless network standards such as 3rd Generation Partnership Project (3GPP) 4G standards, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or future wireless access network standards. Generally, access network 120 may include a radio access network capable of supporting high data rate, low latency, packet optimization, large capacity and coverage, etc. Terminology used herein may refer to particular network standards, such as LTE, for simplicity, but is not intended as a limitation to any particular wireless standard.

eNB 122 may include one or more computation and/or communication devices that receive voice and/or data from MME 132 and/or SGW 134 and wirelessly transmit that voice and/or data to mobile device 110. eNB 122 may also include one or more devices that wirelessly receive voice and/or data from mobile device 110 and transmit that voice and/or data to one of MME 132 and/or SGW 134 or to other mobile devices 110. eNB 122 may combine the functionalities of a base station and a radio network controller (RNC) provided in 2G or 3G radio access networks.

EPC network 130 may include core network architecture of the 3rd Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for mobile device 110. MME 132 may be involved in a bearer activation/deactivation process (e.g., for mobile device 110) and may choose a SGW (e.g., SGW 134) for mobile device 110 at an initial attach and at a time of intra-LTE handover. MME 132 may provide a control plane function for mobility between LTE and different access networks (e.g., different access network 120/eNB 122).

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one implementation, SGW 134 may route and forward user data packets, may act as a mobility anchor for a user plane during inter-eNB handovers, and may act as an anchor for mobility between LTE and other 3GPP technologies. SGW 134 may include a local resource timer to manage network resources. SGW 134 may manage and store contexts associated with mobile device 110 (e.g., parameters of an IP bearer service, network internal routing information, etc.).

PGW 136 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 136 may provide connectivity of mobile device 110 to external packet data networks (PDNs, e.g., in IP core network 150) by being a traffic exit/entry point for mobile device 110. Mobile device 110 may simultaneously connect to more than one PGW 136 for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services. For example, IMS network 140 may include a home subscriber server (HSS) and a policy and charging rules function (PCRF). In one implementation, the HSS may interface with mobile device 110, SGW 134, PGW 136, and/or application server 160 and may provide information to application server 160 that enables application server 160 to communicate with mobile device 110 using IP-based communication protocols. The may perform operations that enforce network policies associated with a communication session with mobile device 110.

IP core network 150 may include one or more networks (e.g., a local area network (LAN), a wide area network (WAN), a metropolitan area network (MAN), the Internet, etc.) capable of communicating with mobile device 110.

Application server 160 may include one or more server devices, or other types of computation or communication devices that gather, process, search, and/or provide information in a manner described herein. In one exemplary implementation, application server 160 may provide applications, data, and/or services to mobile device 110. In one example, application server 160 may provide a service creator application to mobile device 110 and a service interface client application to portable devices 170 to facilitate communications described herein. In another example, application server 160 may manage and/or assign temporary mobile numbers (e.g., mobile directory number (MDN), mobile subscriber integrated services digital network number (MSISDN)) for use by portable devices 170 during service sessions with mobile device 110. Additionally, or alternatively, application server 160 may assign blocks of mobile numbers to mobile device 110 for use in providing temporary services sessions to portable devices 170. As still another example, application server 160 may also manage registration and publication of temporary mobile numbers that are associated with a portable device 170. Application server 160 may be a distributed component. For example, although shown in FIG. 1 within IMS network 140, in other implementations some or all features of application server 160 may be included in devices that communicate via IP core network 150 and EPC network 130.

Portable device 170 may include a computational or communication device that may use local wireless network 180 to communicate with mobile device 110. Portable device 170 may include, for example, a consumer electronics device that is equipped with voice capability and local wireless connectivity. In one implementation, portable device 170 may include an MP3 player, a gaming device, a computer (e.g., tablet, laptop, or desktop), a PDA, an e-reader, etc. In another implementation, portable device 170 may include a mobile device 110 that may have limitations/restrictions from access network 120. For example, a particular mobile device 110 may be located in a region that precludes or deters use of access network 120 (e.g., international roaming, poor signal quality, etc.).

Local wireless network 180 may employ one or more short-range wireless communication standards for a wireless personal area network (WPAN) and/or a wireless local area network (WLAN). Local wireless network 180 may include, for example, IEEE 802.15 (e.g., Bluetooth) and IEEE 802.11x (e.g., WiFi) networks, although other local wireless network technologies may be used. In other implementations, mobile device 110 may employ different networks with different portable devices 170 (e.g., multiple WPANs, simultaneous WLAN and WPAN, etc.).

In FIG. 1, the particular arrangement and number of components of network 100 are illustrated for simplicity. In practice there may be more mobile devices 110, access networks 120, EPC networks 130, IMS networks 140, IP core networks 150, application servers 160, portable devices 170, and local wireless networks 180. For example, there may be thousands of mobile devices 110 and/or portable devices 170.

Figure 2:
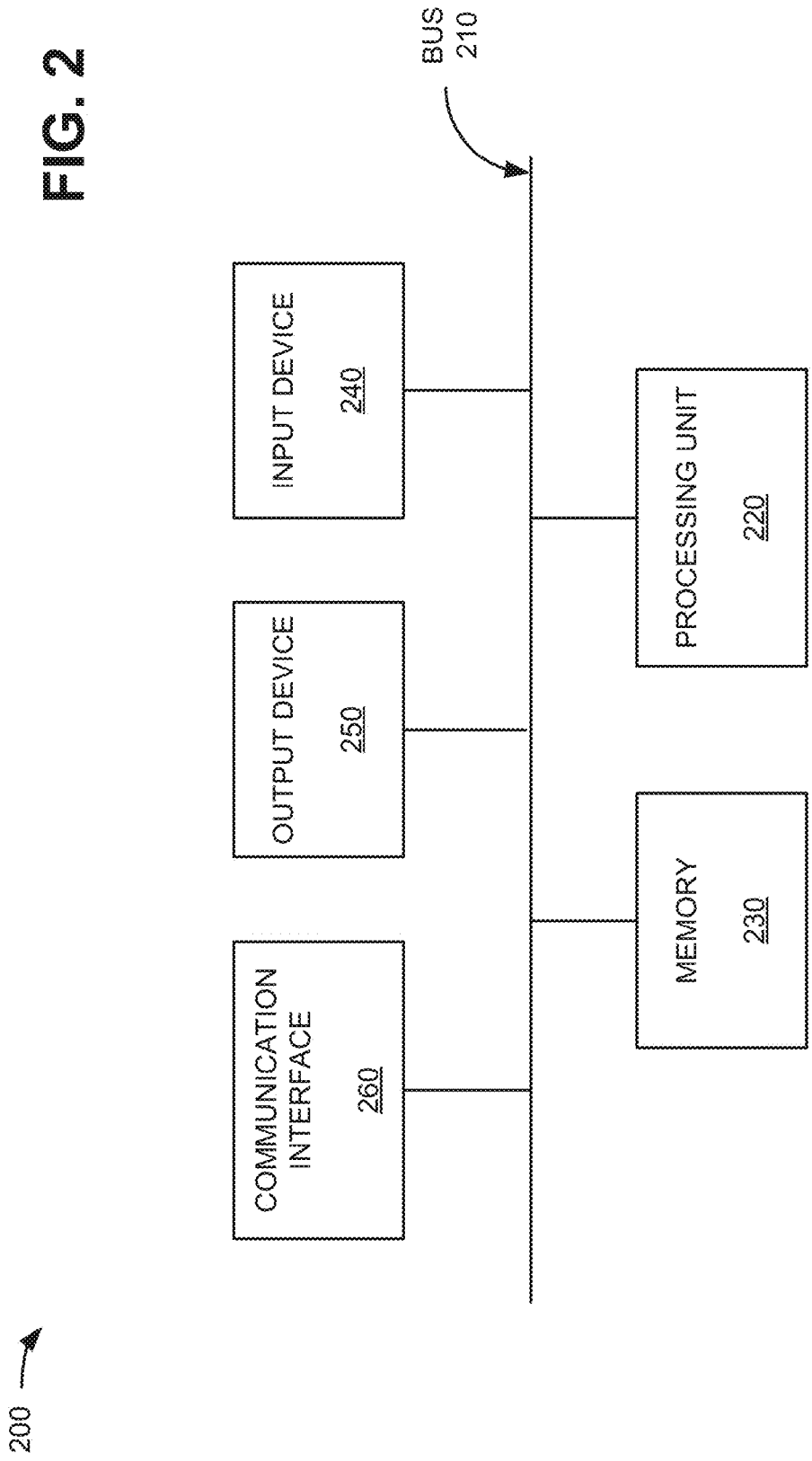
FIG. 2 is a diagram of exemplary components of a device that may correspond to one of the devices of the network depicted in FIG. 1.

FIG. 2 is a diagram illustrating exemplary components of a device 200. Each of mobile device 110, eNB 122, MME 132, SGW 134, PGW 136, application server 160, and portable device 170 may be implemented/installed as a combination of hardware and software on one or more of device 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
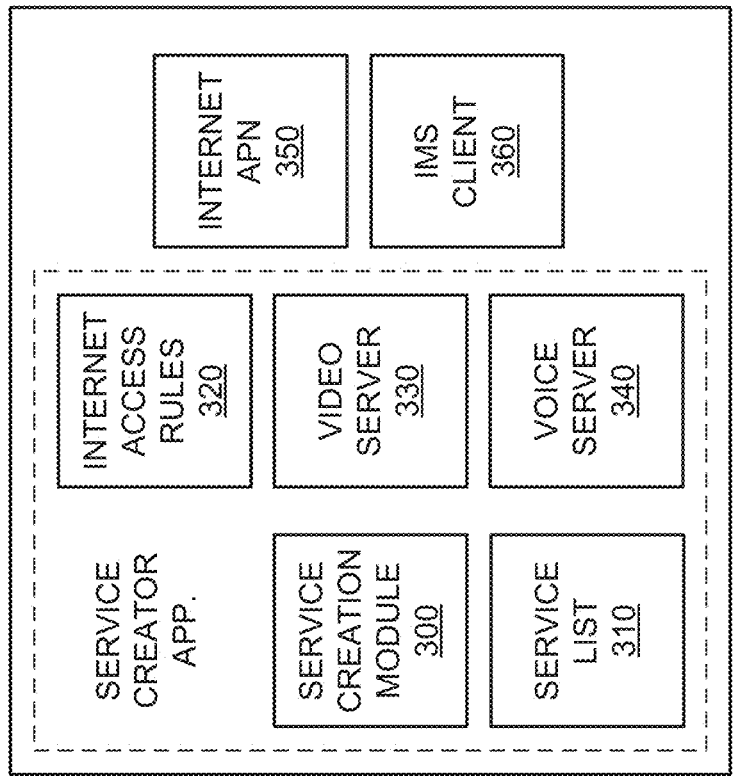
FIG. 3 is a diagram of exemplary functional components of a mobile device of the network of FIG. 1.

FIG. 3 is a block diagram of exemplary functional components of mobile device 110. In one implementation, the functions described in connection with FIG. 3 may be performed by one or more components of device 200 (FIG. 2). Some or all of the functional blocks of FIG. 3 may be included, for example, in a service creator application (e.g., software), stored in memory 230 and executed by processor 220. The service creator application may be provided to mobile device 110, for example, as a download from a remote server. Functional components of mobile device 110 may generally allow mobile device 110 to serve as a bridge between EPC network 130 and portable devices 170 by providing both SIP server and client functionality. As shown in FIG. 3, mobile device 110 may include a service creation module 300, service list 310, internet access rules 320, a video server 330, a voice server 340, an internet access point name (APN) 350, and an IMS client 360.

Service creation module 300 may provide an interface to solicit, receive, and/or store service profiles for particular portable devices and/or user accounts. For example, service creation module 300 may enable a subscriber to assign credentials (e.g., an account name and password) for a particular portable device 170 and/or user of a portable device 170. In one implementation, service creation module 300 may provide the credentials entered by the subscriber to a portable device 170. For example, the credentials may be provided to portable device 170 via a local wireless interface (e.g., similar to a mobile paging process). In another implementation, the credentials may be provided to device 170 manually (e.g., via a USB transfer or via typed/spoken input). The credentials may be used by portable device 170 to register with mobile device 110 for services.

Service creation module 300 may also receive login requests from portable devices 170 and verify credentials from portable devices. Upon successful registration for services by portable device 170, service creation module 300 may assign a temporary mobile number (e.g., MDN or MSISDN) that may be used, with registration of the appropriate credentials, by the user/portable device 170 during the time of the service. In one implementation, the temporary mobile number may be selected from a pool of numbers assigned to mobile device 110 (e.g., by application server 160) and stored locally in mobile device 110 (e.g., in memory 230). In another implementation, mobile device 110 may request a temporary mobile number to be assigned by application server 160 (e.g., from a pool of numbers stored remotely at application server 160).

Service creation module 300 may also manage termination of temporary services to portable device 170. Service creation module 300 may, for example, prompt a subscriber to identify an expiration time for the particular temporary services account associated with portable device 170. When the expiration time occurs, a terminal signal may be generated to disable a particular temporary account. In another implementation, service creation module 300 may receive a subscriber command to terminate the temporary services account for portable device 170. In still other implementations, service creation module 300 may generate a session termination signal when portable device 170 disconnects from a local wireless connection with mobile device 110. Upon receiving the termination signal, service creation module 300 may disable or delete the temporary account (e.g., by updating service list 310). As described further herein, service creation module 300 may also release the temporary mobile numbers back to the pool (e.g., either by updating a local memory or by providing a message to server 160 to de-list the temporary mobile number).

Service creation module 300 may store service account information (e.g., for multiple users/portable devices 170) in service list 310. Service list 310 is described further in connection with FIG. 4. Referring to FIG. 4, service list 310 may include a device identifier (ID) field 410, a user ID field 420, a password field 430, an IP address field 440, a temporary mobile number field 450, a session expiration field 460, and a variety of entries 470 associated with fields 410-460. Device ID field 410 may include a MAC address, name, or other identifier of a portable device 170. User ID field 420 and password field 430 may include a user name and password, respectively, for credentials (e.g., as assigned by the subscriber) to access services provided by mobile device 110. IP address field 440 may include an IP address of a particular portable device 170.

Temporary MDN field 450 may include a MDN, a MSISDN, or another number that may be selected/assigned from a pool of available numbers. Numbers in temporary mobile number field 450 may be associated with a particular device 170 for the duration of a session. Session expiration field 460 may include a duration or time value to define a length of a services session between mobile device 110 and portable device 170. For example, session expiration field 460 may define a length of time for a session or a particular expiration time for the session. Each of entries 470 may include data for one of fields 410-460. In one implementation, some information associated with a particular temporary account (e.g., user ID, password, etc.) may be stored after the temporary account is disabled and made available to simplify future account activations.

According to other implementations, service list 310 may include additional fields, fewer fields, or different fields than shown in FIG. 4. For example, service list 310 may include a field to permit types of services for a particular user (e.g., only voice calls, only video-telephony, only internet, or particular combinations thereof). Also, while service list 310 is depicted as a table, according to other implementations, service list 310 may take the form of some other type of data structure.

Returning to FIG. 3, internet access rules 320 may include a database, list, table, or another compilation of rules for a particular portable device 170 or user of portable device 170. Internet access rules 320 may enable restrictions/firewall capability over internet APN module 350 or other non-guaranteed bit rate (GBR) quality of service (QoS) bearers. For example, internet access rules 320 may include parental controls or other limits that may be associated with a particular user (e.g., a user ID included in user ID field 420).

Video server 330 may interact with portable devices 170 to provide video-telephony services over a local wireless interface. For example, video server 330 may receive requests from portable device 170 via protocols for local wireless network 180 and may forward the requests as IMS requests to IMS client 360 for outgoing video-telephony transmissions over access network 120. Conversely, video server 330 may receive incoming video-telephony transmissions (provided to mobile device 110 via access network 120) from IMS client 360 and may forward the received video-telephony transmissions to portable device 170 via protocols for local wireless network 180.

Voice server 340 may interact with portable devices 170 to provide voice services over a local wireless interface. For example, voice server 340 may receive requests from portable device 170 via protocols for local wireless network 180 and may forward the requests as IMS requests to IMS client 360 for outgoing VoIP transmissions over access network 120. Conversely, voice server 340 may receive incoming VoIP transmissions (provided to mobile device 110 via access network 120) from IMS client 360 and may forward the received video-telephony transmissions to portable device 170 via protocols for local wireless network 180.

Internet access point name (APN) module 350 may include an interface to provide the access point name for the service provider network to which subscriber/mobile device 110 is subscribed. Internet APN module 350 may receive an IP address for Internet services to be provided for a particular portable device 170.

IMS client 360 may initiate sessions (e.g., SIP sessions) to enable sending/receiving of audio, video, and/or text messages by mobile device 110. In implementations described herein, IMS client 360 may support multiple simultaneous voice and/or video calls over access network 120. IMS client 360 may interface with video server 330 and voice server 340 to forward data from access network 120 to portable device 170 and to forward data from portable device 170 to access network 120.

Although FIG. 3 shows exemplary functional components of mobile device 110, in other implementations, mobile device 110 may contain fewer, different, or additional functional components than depicted in FIG. 3.

Figure 5:
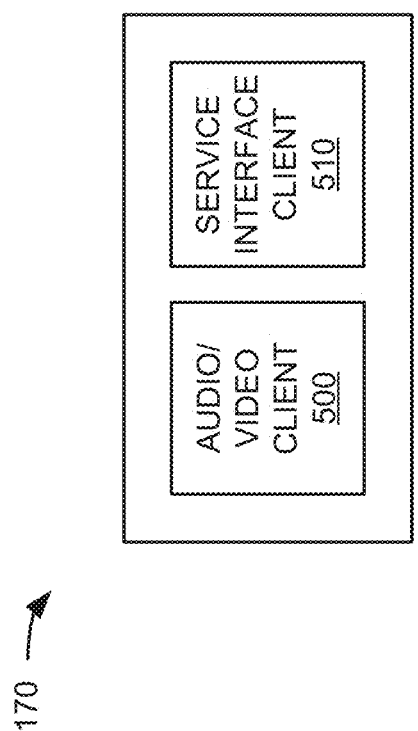
FIG. 5 is a diagram of exemplary functional components of a portable device of the network of FIG. 1.

FIG. 5 is a block diagram of exemplary functional components of portable device 170. In one implementation, the functions described in connection with FIG. 5 may be performed by one or more components of device 200 (FIG. 2). As shown in FIG. 5, portable device 170 may include an audio/video client 500 and a service interface client 510.

Audio/video client 500 may provide a user interface to enable portable device 170 to dial, receive, and conduct voice calls and/or video-telephony calls. Audio/video client 500 may include, for example, a commercial software application or a customized application that interfaces with microphones, touch-screens, and/or buttons (e.g., input devices 240) and speakers and/or display screens (e.g., output devices 250).

Service interface client 510 may provide a user interface to register for a service (e.g., voice, video, or internet service) and submit credentials (e.g., credentials provided by mobile device 110) to mobile device 110. Service interface 510 may receive and implement signals (e.g., SIP-based signals to set up temporary sessions for services (e.g., voice, video, and/or internet services) provided to portable device 170 via mobile device 110.

Although FIG. 5 shows exemplary functional components of portable device 170, in other implementations, portable device 170 may contain fewer, different, or additional functional components than depicted in FIG. 5. For example, portable device 170 may also include a web browser.

Figure 6:
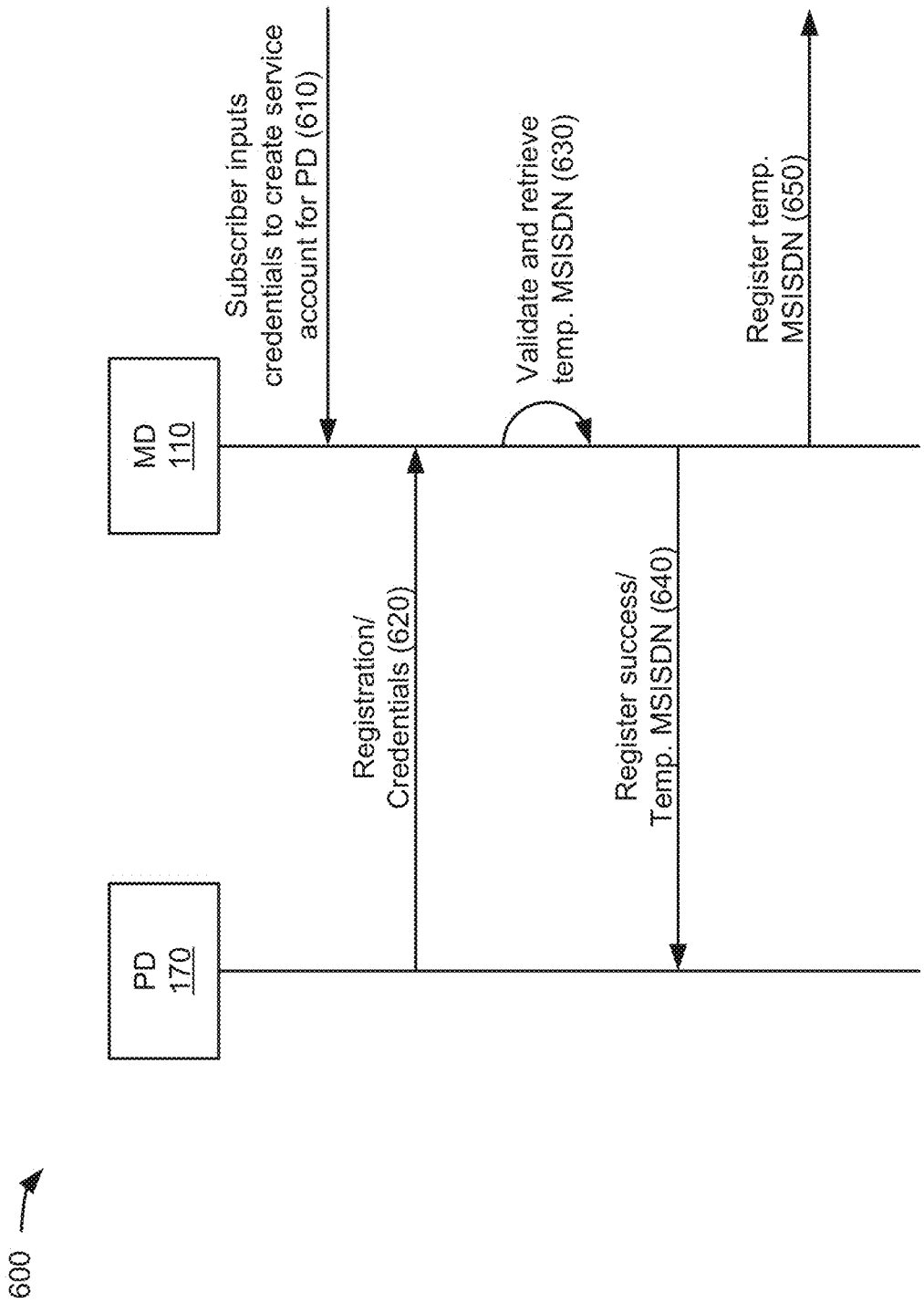
FIG. 6 is a diagram of exemplary communications among devices in a portion of the network of FIG. 1.

FIG. 6 is a diagram of exemplary communications among components of a portion 600 of network 100 according to an implementation described herein. Communications in FIG. 6 may illustrate a service creation process. As shown in FIG. 6, network portion 600 may include mobile device 110 and portable device 170.

A subscriber may provide input to create a service account for a user of a provider device 170, as indicated by reference 610. For example, the subscriber may use mobile device 110 (e.g., service creation module 300) to generate credentials for a temporary service and an expiration time. The registration credentials may be provided to a portable device 170 (e.g., portable device 170-1) via, for example, a paging message or via a manual transfer.

As shown by reference number 620, portable device 170 (e.g., service interface client 510) may use the credential provided by the subscriber/mobile device 110 to register with mobile device 110. For example, using a local wireless connection (e.g., local wireless network 180), portable device 170 may initiate a registration process with mobile device 110 to provide a user name and password.

Mobile device 110 (e.g., service creation module 300) may receive the credentials from portable device 170. Mobile device 110 may validate the credentials (e.g., using service list 310) and, assuming proper credentials, may obtain a mobile number to be used for the service period. Mobile device 110 may retrieve the mobile number, for example, from a local pool of available numbers or from a remote server (e.g., application server 160).

Mobile device 110 may provide a successful registration indication to provider device 170, as indicated by reference number 640. The registration success message may be provided via local wireless network 180. Portable device 170 may receive the temporary mobile number and may provide an indication to the portable device user that a service is enabled. In one implementation, the registration success message may also include an indication of an available time limit for the temporary services (e.g., based on information from service list 310).

In one implementation, as indicated by reference number 650, mobile device 110 may also provide an indication that a temporary mobile number has been assigned to a particular portable device user. For example, user contact information may be managed via a particular web portal that may store and update contact information for users (e.g., based on a standard user name, for example). When a temporary account for a particular portable device user is activated, the web portable may update a link (e.g., associated with a user profile) to allow third party callers (e.g., who may also be registered with the web portal) to access the temporary mobile number. In one implementation, the link may simply activate an auto-dial feature without showing the actual temporary number to portal customers, so that changes to a temporary mobile number may be transparent to third-party callers.

Although FIG. 6 shows exemplary components of network portion 600, in other implementations, network portion 600 may include different components and/or additional components than depicted in FIG. 6. Alternatively, or additionally, one or more components of network portion 600 may perform one or more other tasks described as being performed by one or more other components of network portion 600. For example, in one implementation, registration of a temporary MSISDN in reference number 650 may be initiated by a portable device 170.

Figure 7:
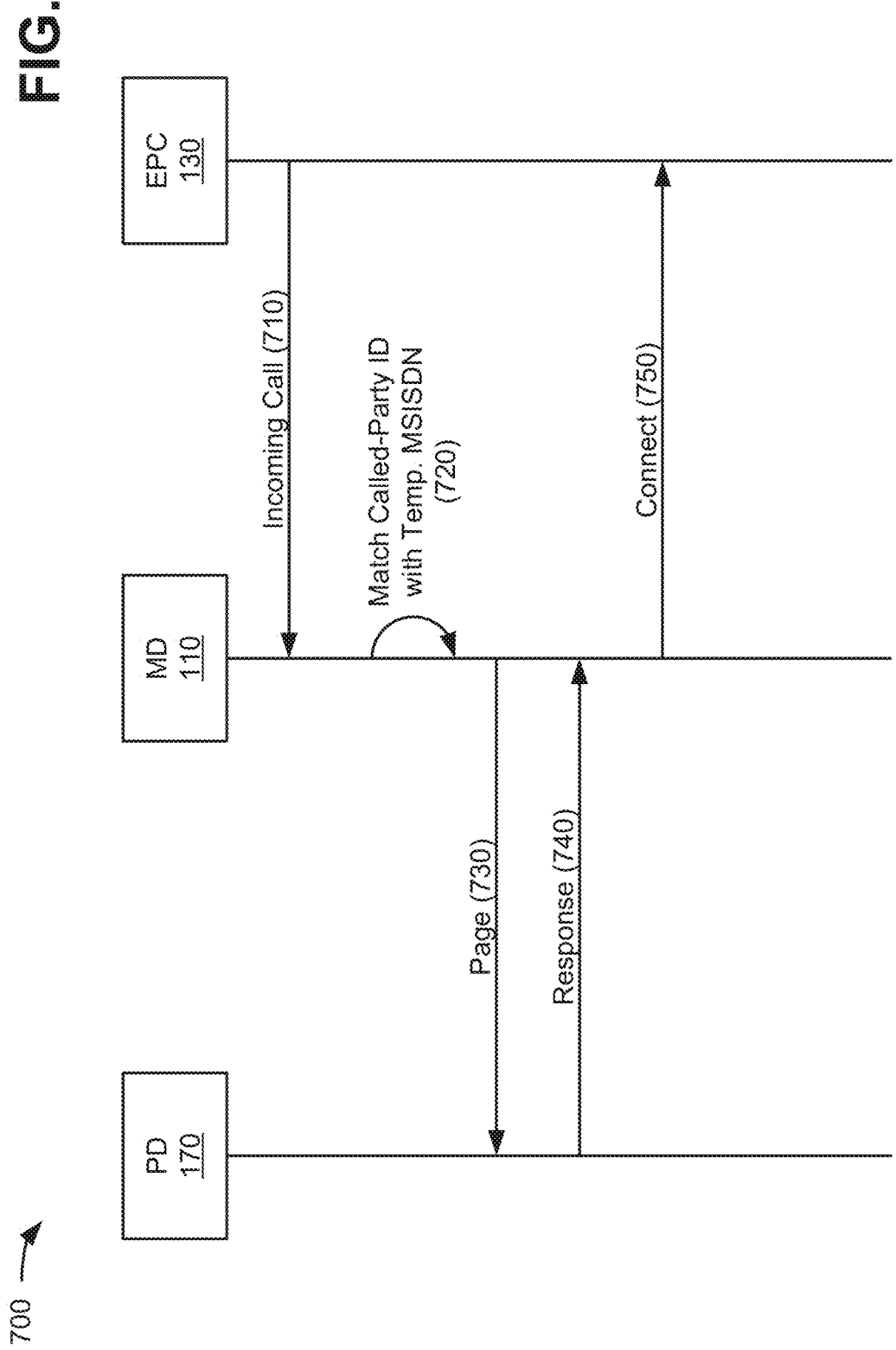
FIG. 7 is a diagram of exemplary communications among devices in another portion of the network of FIG. 1.

FIG. 7 is a diagram of exemplary communications among components of a portion 700 of network 100 according to an implementation described herein. Communications in FIG. 7 may represent receiving an incoming call (e.g., a voice call, video-telephony call, or SMS message) by portable device 170. As shown in FIG. 7, network portion 700 may include mobile device 110, EPC 130, and portable device 170. Setup procedures may be conducted use SIP and/or IMS signaling protocols.

Using the temporary mobile number assigned to portable device 170, a third-party device (not shown) may initiate an incoming call 710 to portable device 170. The incoming call may be directed to mobile device 110 via EPC 130 using, for example, standard IMS/SIP protocols. As indicated by reference number 720, mobile device 110 may match the user name/portable device 170 to the mobile number of incoming call 710 (e.g., using service list 310).

Once mobile device 110 has matched an incoming call to a particular portable device 170, mobile device 110 may send a page 730 to portable device 170. Portable device 170 may respond to page 730 with a response 740 (e.g., a SIP response code or similar response). Based on response 740, mobile device 110 may connect 750 to EPC network 130 enable communication between portable device 170 and the third-party device. Call teardown procedures may be similarly conducted using SIP and/or IMS signaling protocols.

Figure 8:
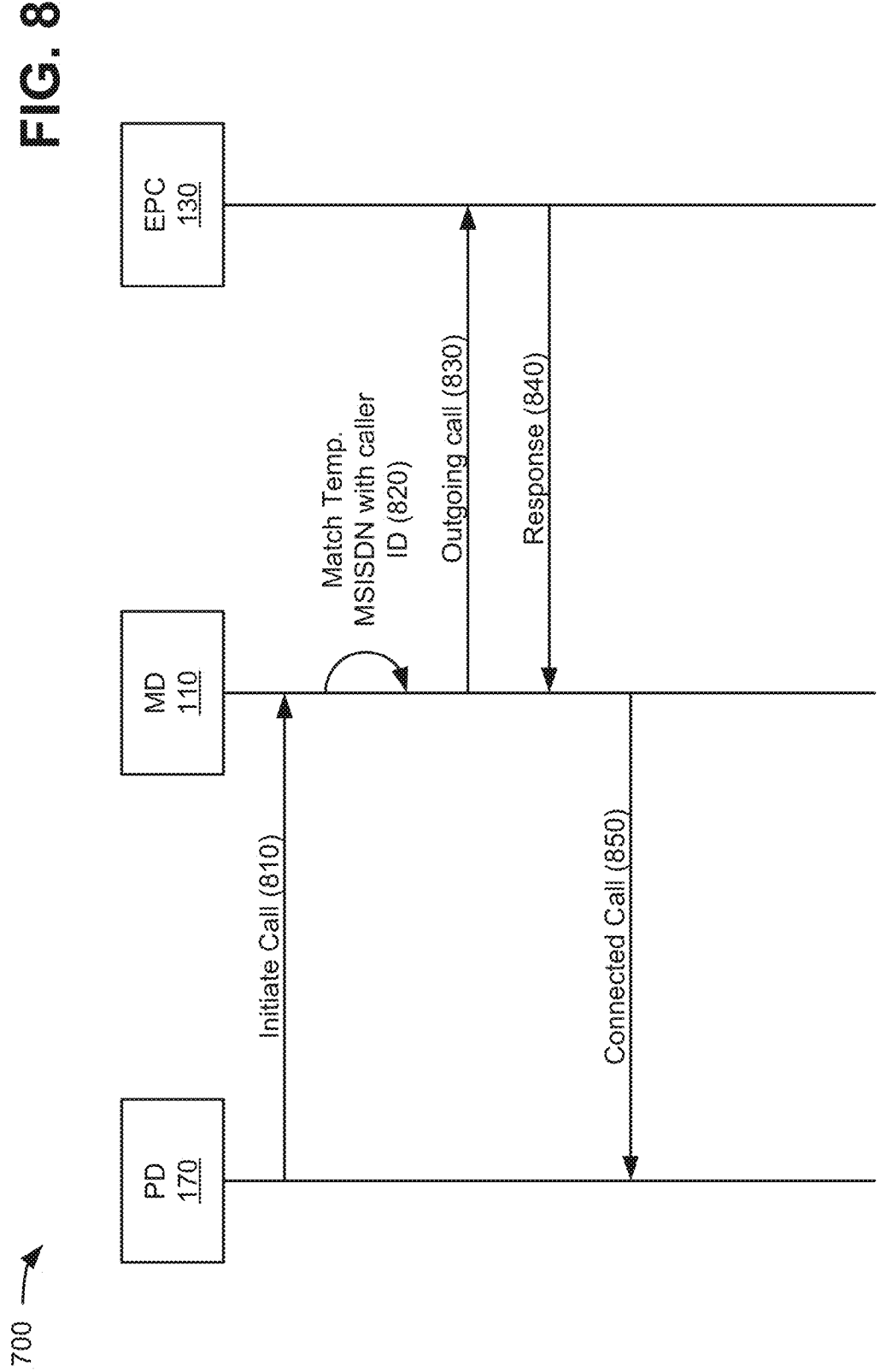
FIG. 8 is a diagram of additional exemplary communications among devices in the portion of the network of FIG. 7.

FIG. 8 is a diagram of additional exemplary communications among components of portion 700 of network 100 according to another implementation described herein. Communications in FIG. 8 may represent establishing an outgoing call (e.g., a voice call, video-telephony call, or SMS message) by portable device 170. Setup procedures may be conducted use SIP and/or IMS signaling protocols.

As shown in FIG. 8, portable device 170 may initiate a call 810 using, for example, SIP protocols or similar variations. Mobile device 110 may receive initiated call 810 and may match the temporary mobile number from the call with the caller ID to verify (e.g., using service list 310) that portable device 170 has an active temporary service account, as indicted by reference number 820. Assuming the temporary service account is verified, mobile device 110 may direct the outing call 830 over EPC network 130 (and to a particular third-party recipient, not shown) using SIP/IMS protocols.

Mobile device 110 may receive a response 840 from EPC network 130 to setup the call with the third party. Upon receiving response 840, mobile device 110 may forward the connected call 850 to portable device 170 to complete the call setup. Call teardown procedures may be similarly conducted using SIP and/or IMS signaling protocols.

Figure 9:
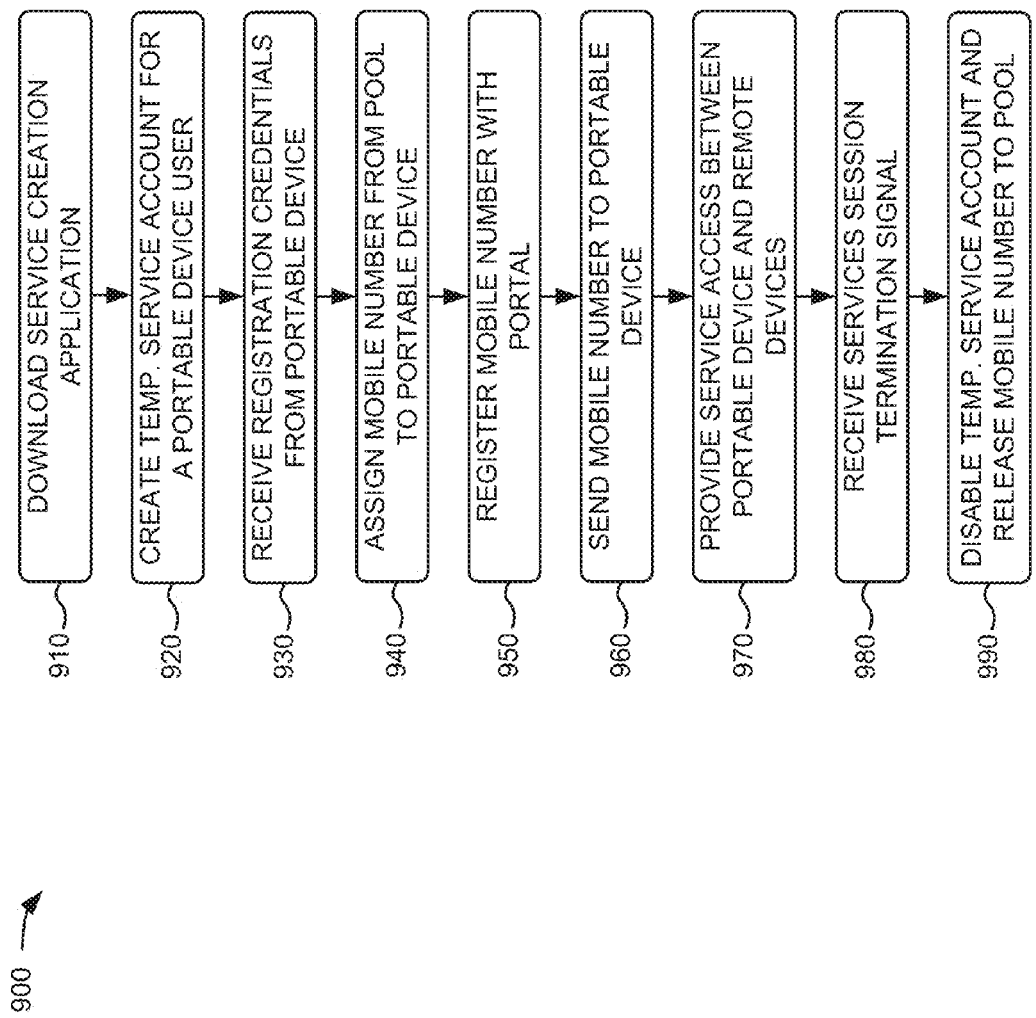
FIG. 9 is a flow chart of an exemplary process of configuring temporary access to services for portable devices according to an implementation described herein.

FIG. 9 is a flow chart of an exemplary process of configuring temporary access to services for portable devices according to an implementation described herein. In one implementation, process 900 may be performed by mobile device 110. Process 900 is described with reference to components in figures described above.

As shown in FIG. 9, process 900 may include downloading a service creation application (block 910) and creating a temporary service account for a portable device user (block 920). For example, a subscriber may download a service creator application to mobile device 110. The service creator application may provide a user interface on mobile device 110 to allow a subscriber to create a temporary service account for portable device 170. The subscriber may assign credentials (e.g., an account name and password) for the particular portable device 170 and/or a user of portable device 170. The subscriber may also assign an expiration time and/or duration for the temporary service account. The credentials and expiration time may be stored in a local memory (e.g., service list 310). The registration credentials may be provided to a portable device 170 (e.g., portable device 170-1) via a paging message or via a manual transfer.

Process 900 may also include receiving registration credentials from the portable device (block 930) assigning a mobile number, from a pool, to the portable device (block 940), and registering the mobile number with a portal (block 950). For example, portable device 170 may use the credential provided by the subscriber/mobile device 110 to register for temporary services with mobile device 110. In one implementation, portable device 170 may use a local wireless connection (e.g., local wireless network 180) to provide a user name and password. Mobile device 110 may receive the user name/password from portable device 170 and may validate them (e.g., against service list 310). If the credentials are valid, mobile device 110 may obtain a temporary mobile number to be used for the service period. Mobile device 110 may retrieve the mobile number, for example, from a local pool of available numbers or from a remote server (e.g., application server 160). In one implementation, mobile device 110 may also provide an indication to a remote portal server that a temporary mobile number has been assigned to a particular portable device user.

Process 900 may further include sending the mobile number to portable device (block 960), and provide service access between the portable device and remote devices (block 970). For example, mobile device 110 may provide a successful registration indication to provider device 170, via local wireless network 180. In one implementation, the registration indication may include, for example, the temporary mobile number assigned to portable device 170 and an expiration period for the session. Upon receiving the successful registration indication, provider device 170 may use utilize services over EPC network 130 via a local wireless connection with mobile device 110. Services may include, for example, sending/receiving voice calls, sending/receiving video calls, and internet access.

Process 900 may also include receiving a services session termination signal (block 980), and disabling the temporary service account and releasing the mobile number to pool (block 990). For example, mobile device 110 may identify an expiration time for the particular temporary services account associated with portable device 170. In another implementation, mobile device 110 may receive a subscriber command to terminate the temporary services account. In still other implementations, mobile device 110 may generate a session termination signal when portable device 170 disconnects from a local wireless connection with mobile device 110. Upon receiving the termination signal, mobile device 110 may disable the temporary account (e.g., by updating service list 310) and release the temporary mobile number back to the pool (e.g., either by updating a local memory or by providing a message to server 160).

Figure 10:
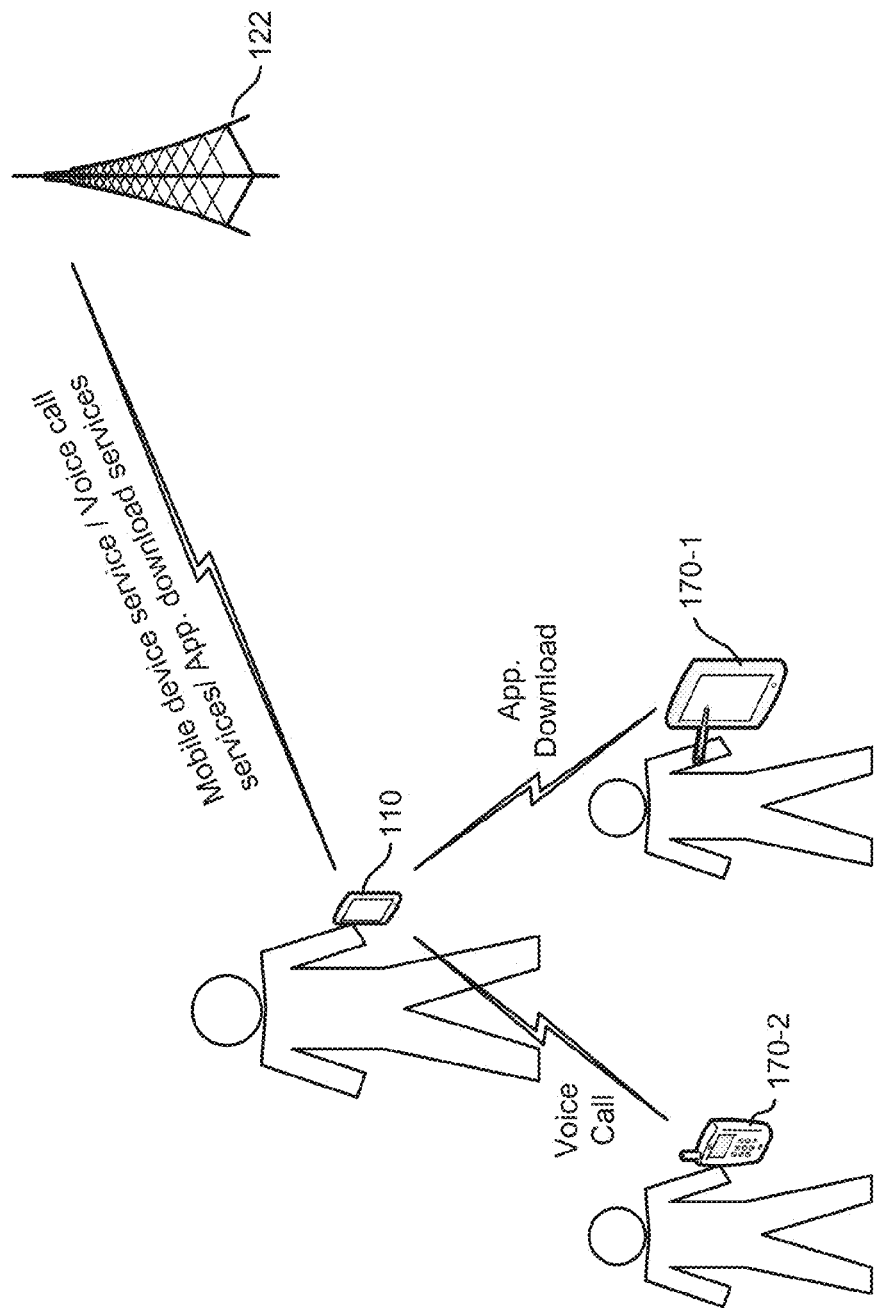
FIG. 10 is a diagram of an exemplary use case according to an implementation described herein.

FIG. 10 provides a diagram of an exemplary use case according to an implementation described herein. Dad takes Jonny and his friend, Raul (a foreign exchange student) on a trip to the museum. On the way home, they get caught in a traffic jam. Dad is using this smart phone (mobile device 110) to get information on the accident and determine alternate routes. Jonny is bored with current options on his tablet (PD 170-1), which has only local network connectivity. Raul needs to notify his guardians of his whereabouts. However, a call using the service plan for Raul's smart phone (PD 170-2) will incur significant roaming charges. Using the service creator application 300 on his mobile device 110, Dad activates a temporary services account for Jonny and another temporary services account for Raul. Jonny uses the services interface client 510 on his tablet (PD 170-1) to register with mobile device 110 to access the internet and download a new app to his tablet (PD 170-1). Raul uses the services interface client 510 on his smart phone (PD 170-2) to register with mobile device 110 to make a voice call using the service plan for mobile device 110. Dad continues to use mobile device 110 for news and GPS-based services. Mobile device 110 communicates with eNB 122 (e.g., via access network 120) to provide services to mobile device 110, internet access to PD 170-1, and voice calling to PD 170-2.

In other implementations, mobile device 110 may provide temporary voice, video, and/or internet communications for portable devices 170 at other remote locations. Mobile device 110 may also permit controlled communications (e.g., parental controls) for voice, video, and/or internet communications from portable devices 170.

In systems and/or methods described herein, a mobile device may be configured to transmit/receive signals over a local wireless network and to transmit/receive signals over a broadband cellular network. The mobile device may present, to a subscriber, an interface to receive subscriber input (e.g., credentials) for a temporary service account for a user associated with a portable device, and create the temporary service account based on the subscriber input. The mobile device may receive, via the local wireless network, a registration request from the portable device that includes the user credentials, and send, via the local wireless network, a registration confirmation to the portable device. The mobile device may then provide, to the portable device, mobile services via both the broadband cellular network and the local wireless network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
  receiving, by a mobile device, subscriber input for a temporary service account for a user associated with a portable device;
  creating, by the mobile device, the temporary service account;
  receiving, by the mobile device and from the portable device via a local wireless network, a registration request to use the temporary service account;
  assigning, by the mobile device and to the portable device, a temporary mobile number selected from an available pool of mobile numbers;
  sending, by the mobile device and via the local wireless network, a registration confirmation to the portable device; and
  providing, by the mobile device and to the portable device, using the temporary mobile number, mobile services via both a broadband cellular network and the local wireless network.

2. The method of claim 1, further comprising:
receiving a termination signal for the temporary service account;
disabling the temporary services account based on the termination signal; and
releasing the mobile number back to the available pool based on the termination signal.

3. The method of claim 2, further comprising:
registering, with a remote service, the temporary mobile number associated with the user; and
de-listing, with the remote service, the temporary mobile number based on the termination signal.

4. The method of claim 2, wherein the termination signal is based on one of:
an assigned duration for the temporary account,
a command from the subscriber, or
a loss of network connectivity between the portable device and the mobile device.

5. The method of claim 1, wherein the subscriber input for the temporary service account includes login credentials for the user.

6. The method of claim 1, wherein the subscriber input for the temporary service account includes an account duration or a type of service authorized for the temporary service account.

7. The method of claim 1, wherein providing the mobile services includes:
receiving first data from the portable device via the local wireless network,
forwarding the first data to remote devices via the broadband cellular network,
receiving second data from devices via the broadband cellular network, and
forwarding the second data to the portable device via the local wireless network.

8. The method of claim 1, further comprising:
providing, by the mobile device, a user interface to receive the subscriber input.

9. The method of claim 1, wherein the pool of mobile numbers is stored in a local memory of the mobile device.

10. The method of claim 1, wherein the temporary mobile number is requested from a remote device via the broadband cellular network.

11. The method of claim 1, further comprising:
receiving subscriber input for another temporary service account for another user associated with another portable device;
creating the other temporary service account;
receiving, via another local wireless network, another registration request from the other user; and
providing, to the other portable device, mobile services using both the broadband cellular network and the other local wireless network.

12. The method of claim 1, wherein, when providing the mobile services, the mobile device communicates with the portable device using session initiation protocol (SIP) standards.

13. The method of claim 1, wherein the broadband cellular network includes a long-term evolution (LTE) network, and wherein the local wireless network includes one of:
a wireless local area network (WLAN), or
a personal area network (PAN).

14. A mobile device, comprising:
one or more memories to store instructions;
a wireless transceiver to transmit and receive signals over a local wireless network;
a wireless transceiver to transmit and receive signals over a broadband cellular network; and
one or more processors configured to execute instructions in the one or more memories to:
present, to a subscriber, an interface to receive subscriber input for a temporary service account for a user associated with a portable device, wherein the subscriber input includes user credentials for the temporary service account;
create the temporary service account based on the subscriber input;
receive, via the local wireless network, a registration request from the portable device that includes the user credentials;
assign, to the portable device, a temporary mobile number selected from an available pool of mobile numbers;
send, via the local wireless network, a registration confirmation to the portable device; and
provide, to the portable device and using the temporary mobile number, mobile services via both the broadband cellular network and the local wireless network.

15. The mobile device of claim 14, wherein the processor is further configured to:
receive a termination signal for the temporary service account; and
disable the temporary services account based on the termination signal.

16. The mobile device of claim 15, wherein the processor is further configured to:
release the temporary mobile number back to the available pool based on the terminal signal.

17. The mobile device of claim 14, wherein the mobile services include one or more of:
internet access,
voice calling, and
video-telephony calling.

18. The mobile device of claim 14, wherein the processor is further configured to:
present, to the subscriber, an interface to receive additional subscriber input for internet access rules associated with the user; and
apply, to the mobile services provided to the portable device, the internet access rules, wherein the one or more memories further stores the internet access rules.

19. A tangible non-transitory computer-readable medium comprising computer-executable instructions, the computer-readable medium comprising one or more instructions to:
present, to a subscriber, an interface to receive subscriber input for a temporary service account for a user associated with a portable device, wherein the subscriber input includes user credentials for the temporary service account;
create the temporary service account based on the subscriber input;
receive, via the local wireless network, a registration request from the portable device that includes the user credentials;
assign, to the portable device and based on the credentials, a temporary mobile number selected from an available pool of mobile numbers;
send, via the local wireless network, a registration confirmation to the portable device, wherein the registration confirmation includes the temporary mobile number; and provide, to the portable device, mobile services, using the temporary mobile number, via both the broadband cellular network and the local wireless network.

20. A tangible non-transitory computer-readable medium comprising instructions executed by a processor of a mobile device to:
- present, to a subscriber, an interface to receive subscriber input for a temporary service account for a user associated with a portable device, wherein the subscriber input includes user credentials for the temporary service account;
- create the temporary service account based on the subscriber input;
- receive, via a local wireless network, a registration request from the portable device that includes the user credentials;
- assign, to the portable device and based on the credentials, a temporary mobile number selected from an available pool of mobile numbers;
- send, via the local wireless network, a registration confirmation to the portable device, wherein the registration confirmation includes the temporary mobile number; and
- provide, to the portable device and by the mobile device, mobile services, using the temporary mobile number, via both the broadband cellular network and the local wireless network.

* * * * *